United States Patent [19]

Fabry et al.

[11] Patent Number: 4,965,564
[45] Date of Patent: Oct. 23, 1990

[54] DISPLAY APPARATUS WITH LIQUID CRYSTAL CELLS, PREFERABLY FOR MOTOR VEHICLES

[75] Inventors: Ehrenfried Fabry, Nuremberg; George Goddard, Wendelstein; Dieter Meyer, Feucht, all of Fed. Rep. of Germany

[73] Assignee: Robert Bosch GmbH, Stuttgart, Fed. Rep. of Germany

[21] Appl. No.: 301,882

[22] PCT Filed: Apr. 7, 1987

[86] PCT No.: PCT/DE87/00154

§ 371 Date: Dec. 16, 1988

§ 102(e) Date: Dec. 16, 1988

[87] PCT Pub. No.: WO88/01399

PCT Pub. Date: Feb. 25, 1988

[30] Foreign Application Priority Data

Aug. 14, 1986 [DE] Fed. Rep. of Germany ....... 3627697

[51] Int. Cl.$^5$ ................................................ G09G 3/36
[52] U.S. Cl. ..................................... 340/784; 340/702; 340/815.1; 350/345
[58] Field of Search ............ 340/784, 765, 702, 425.5, 340/438, 701, 815.1; 350/345, 339 F; 362/23, 27, 29

[56] References Cited

U.S. PATENT DOCUMENTS

| 4,386,826 | 6/1983 | Stolov | 350/345 |
| 4,649,381 | 3/1987 | Masuda et al. | 340/784 |
| 4,673,252 | 6/1987 | Kugo et al. | 350/339 F |
| 4,772,885 | 9/1988 | Uehara et al. | 340/784 |

FOREIGN PATENT DOCUMENTS

| 8510864 | 7/1985 | Denmark . |
| 0140350 | 5/1985 | European Pat. Off. . |
| 3244710 | 6/1984 | Fed. Rep. of Germany . |
| 3301914 | 7/1984 | Fed. Rep. of Germany . |
| 2539900 | 7/1984 | France . |
| 2061587 | 3/1981 | United Kingdom . |

Primary Examiner—Jeffery A. Brier
Attorney, Agent, or Firm—Michael J. Striker

[57] ABSTRACT

A display apparatus for use in motor vehicle for displaying measured values, functions status and disturbance indications, and the like comprising at least one liquid crystal cell having areas (A, B) with different coloration of the indications. In order to enable a flexible coloration for individual coloring which can be changed or switched at any time, the areas (A, B) with different coloration of indications on the back of a surface of a transmission liquid crystal cell are separated from one another by light shafts in which light sources with corresponding different colors are arranged. The colored light of one light source for one area (A) is screened by a partition from the other area (B) of the liquid crystal cell (FIG. 1).

7 Claims, 2 Drawing Sheets

DISPLAY APPARATUS WITH LIQUID CRYSTAL CELLS, PREFERABLY FOR MOTOR VEHICLES

BACKGROUND OF THE INVENTION

The invention relates to a display apparatus for measured values, trouble indications and the like for use preferably in motor vehicles, In a known display apparatus of this type, areas of the liquid crystal cell having various coloring of the letters and symbols and are data to be displayed, respectively, are by color foils which are inserted between the liquid crystal cell and a transflector which is arranged behind the liquid crystal cell, so that good coloration is achieved in bright ambient light so in darkness (Elektronik, 1983, 19, page 16). It is also known to arrange a corresponding color imprint on the back of the liquid crystal cell in the areas with different coloration when using transmissive liquid crystal cell. This is particularly desirable in large liquid crystal displays in motor vehicles where warning or trouble indications are to be emphasized relative to other indications such as clock time, velocity, engine speed and the like by means of different colors.

However, a disadvantage of the known solutions is that each area of the liquid crystal cell can only have one color assigned to it. If different colors of the various areas of the liquid crystal cell are desired in different types of vehicles it is necessary to have available a corresponding wide assortment of liquid crystal cells, which requires a considerable expenditure on storage. It is also disadvantageous that the different coloring produced by means of foils or color printing affect the blocked areas of the liquid crystal cell which are not triggered, so that an undesirable irregular background brightness results in these areas.

SUMMARY OF THE INVENTION

The object of the present invention is to make it possible to freely select a different coloring in various areas of the liquid at any crystal cell at any time so as to provide complete flexibility for the selection of the coloration with limited storage capacities.

The object of the invention in achieved in a display apparatus, according to the invention by employing a liquid crystal cell having areas of different coloration, light shafts for supporting light sources having different color for illuminating the areas of the liquid crystal cell, of which at least one light source is turned on permanently to provide a uniform background brightness for the liquid crystal cell. The apparatus according to the present invention has the advantage that while the areas of the liquid crystal cell with different coloration are determined by the design and arrangement of the light shafts behind the liquid crystal cell, the desired coloration is nevertheless first achieved by the introduction of a light source with the desired color into the individual light shafts. Another advantage consists in that a uniform background brightness is made possible by known measures, such as the arrangement of scattering foils and fluorescent plates, screen print and the like, in the blocked areas of the liquid crystal cell and in that a uniform transmission of light in the triggered areas of the liquid crystal cell is achieved, at that the transition of color between the areas of different coloration is so smooth that a very good optical appearance results. It is particularly advantageous to arrange a plurality of light sources of different colors in at least one of the light shafts, which light sources can be switched on individually. Accordingly, the color can be switched in this area of the liquid crystal cell e.g. in that a bulb with white light is provided for the background brightness in that a green light is switched on for function and condition indications, insofar as the displayed values and functions are normal, and finally in that a red light is switched on for this area of the liquid crystal cell for displaying disturbances, wherein the trouble indication is distinguished of the liquid crystal cell by means of the intermittent display of the problem function.

BRIEF DESCRIPTION OF THE DRAWING

The invention itself, however, both as to its construction and its method of operation, together with additional objects and advantages thereof, will be best understood from the following description of the preferred embodiment with reference to the accompanying drawings, wherein.

DESCRIPTION OF THE PREFERRED EMBODIMENT

Figure 1:
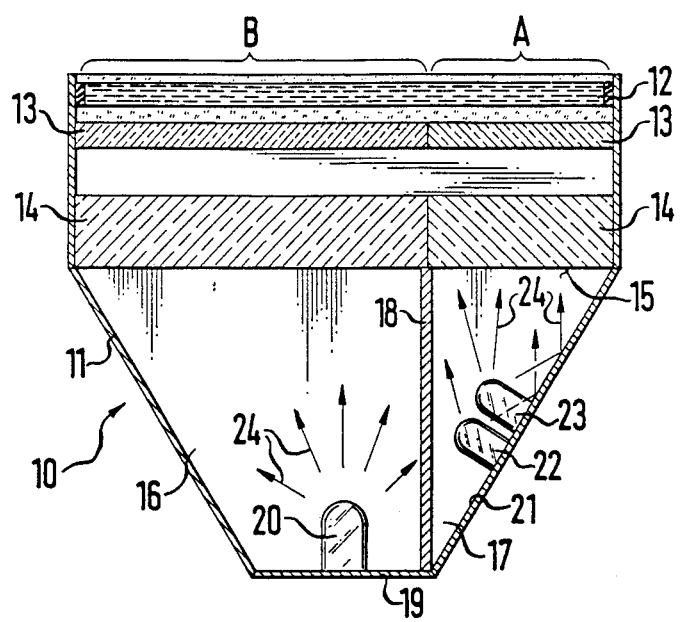
FIG. 1 shows an display apparatus with two areas having different colors and a plurality of lights for one of these areas.

In FIG. 1, a display apparatus having a motor vehicle for a large liquid crystal display is designated by 10. A housing wall 11 support at its front, a transmissive liquid crystal cell 12 of conventional known construction, in which liquid crystal substance is introduced and sealed between a glass pane equiped with two electrodes. The liquid crystal cell 12 comprises two adjacent areas A and B having different coloration of letters, symbols and indications, the area A on the right serves to display various functions and states which must be monitored and which are displayed continuously or when disturbances occur, respectively, by means of an electronic device, not shown. The area B serves to display other data, scales and the like, which are triggered respectively by the electronic device. Scattering foils 13, which are colored, e.g. yellow, orange or red, are arranged behind the liquid crystal cell 12 so as to adjoin one another and cover differently colored area A and B, respectively, in each instance. Fluorescent plates 14 for the areas A and B are arranged adjacent to each other behind the scattering foils 13 at a certain distance and are likewise colored, e.g. yellow, orange or red, A screen print 15 of an opaque material is applied in a known manner to the back of the plate 14 locate on the right-hand side, which screen print 15 serves to provide a uniform illumination of the liquid crystal cell 12 within the area A by punctiform light sources. Light shafts 16 and 17, which are assigned to the areas A and B of the liquid crystal cell 12, are arranged behind the plates 14 and are formed substantially by exclosure housing enclosure 11 an are separated from one another by means of a partition 18. A bulb 20 with white light is inserted at the base 19 of the light shaft 16 as the left-hand side as a light source and serves to provide the background brightness in the area B of the liquid crystal cell 12 and as for the illumination of the controlled areas, e.g. linear or circular scales. A first bulb 22 with white light and, adjacent to it, a second bulb 23 with red light are arranged in the light shaft 17 on the right-hand side therefore on a side wall which forms a reflector 21. The bulbs 22 and 23 can be switched on separately. The white bulb 22 is preferably switched on permanently to provide the background brightness, whereas the red bulb 23 is switched on optionally according to the wiring of the electronic device for displaying disturbances and for providing function and condition display, respectively. The direction of the light emitted by the bulbs 20, 22 and 23 is indicated by an arrow 24.

It can be seen that a portion of the light from the bulbs 22, 23 in the light shaft 17 on the right-hand side therefore strikes the reflector 21 and is reflected therefore from toward the area A of the liquid crystal cell 12.

Another bulb, e.g. a green bulb, can be arranged in the light shaft 17 next to the red bulb 22, which green bulb is then switched on together with the white bulb 23 or by itself whenever the value to be displayed in the area A of the liquid crystal cell 12 lies within the allowable boundaries. On the other hand, when errors or disturbances occur, the red bulb 23 is switched on. In order to prevent the colored light of the bulb 23 for the area A of the liquid crystal cell 12 from reaching area B, the light source from area B of the liquid crystal cell 12 for the white coloration must be screened by the partition 18. Moreover, a transfer of light from area A area B due to the scattering foils 13 and the fluorescent plates 14 is prevented by assiging the latter only to their respective areas instead of having a continuous scattering foil covering the entire liquid crystal cell 12, or having a continuous fluorescent plate. A smooth color, transition and a uniform background brightness is achieved in the liquid crystal cell 12 at the scattering foils 13 and the fluorescent plates 14 for the two areas A and B of the liquid crystal cell 12 adjoin one another.

Figure 2:
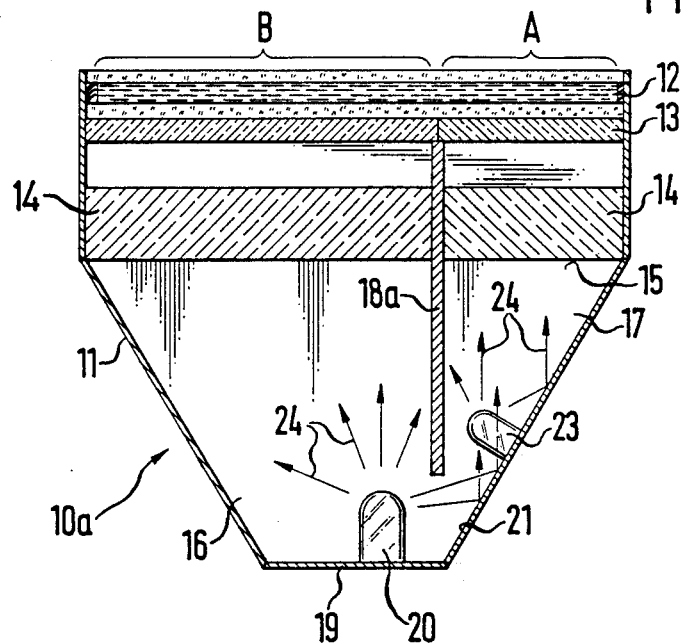
FIG. 2 shows sectional view display apparatus with shared light for providing background brightness and FIG. 3 shows a cross-sectional view of a liquid crystal cell through another embodiment of a liquid crystal cell with shared light for the background brightness.

The embodiment, according to FIG. 2, has essentially the same construction of the display apparatus as that in FIG. 1, and the same reference numerals are used. However, the white bulb 22 for the light shaft 17 at the right-hand there is omitted; Instead, the partition 18a is shortened in the area of the white bulb 20 of the adjacent light shaft 16 in such a way that the light of this bulb 20 strikes the reflector 21 of the adjacent light shaft 17 from beneath the partition 18a and is deflected forward to the liquid crystal cell 12. In this way, the most uniform possible background brightness is achieved over all areas of the liquid crystal cell 12 by one bulb. The shared white bulb 20, which is switched on permanently during operation, is arranged at the base 19 of the light shaft 16 in such a way that its light strikes all areas of the liquid crystal cell 12 in a uniform manner. Moreover, in the embodiment according to FIG. 2 the partition 18a between the adjacent fluorescent plates 14 extends to scattering foils 13, whereas in the embodiment according to FIG. 1 the partition 18 between the adjacent light shafts 16 and 17 only extends until the back surface of the fluorescent plates 14. In the case of FIG. 2, the transfer of the colored light from the light shaft 17 on area B of the liquid crystal cell 12 with a different coloration is suppressed even more strongly than in the example in FIG. 1. The color transition in areas A and B is accordingly not as smooth as in the embodiment according to FIG. 1, but this is unimportant with uniform illumination. However, in this base, the adjoining areas A and B of the liquid crystal cell 12 can be used for displays of different colors without a color transition area between the areas A and B.

Figure 3:
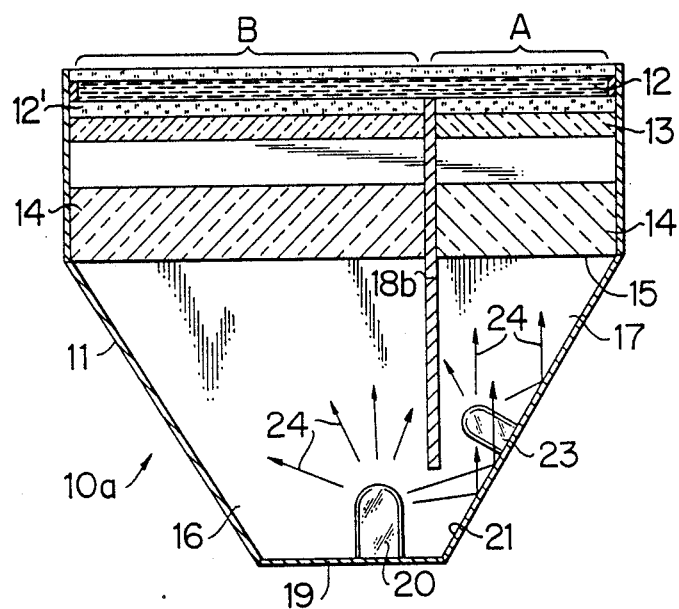

The invention is not limited to the embodiment shown, since the design and arrangement of various parts can be changed within the scope of the invention. Thus, for example, a light guide can also be used from beneath the shortened partition 18a or in place of a shortened partition 18a, respectively, for transfering light from the white bulb 20 into the light shaft 17 on the right-hand side, thereof the light from the bulb 20 being diverted by a light guide to the rear in area A of the liquid crystal cell 12. As shown in the embodiment of FIG. 3, partition 18b may extend from the back surface 12' of the liquid crystal cell 12 instead of the scattering foil 13. The scattering foils 13 and fluorescent plates 14 can be omitted or replaced with other means functioning in a similar manner, as desired. The screen print 15 on the back of the plate 14 can also be applied to a separate foil or on the back of the corresponding scattering foil 13. It can be entirely dispensed with, if desired, or provided in a corresponding manner not only for the area A on the right-hand side, but also for area B on the left-hand side 12 in order to achieve a uniform illumination. If it is desirable, for example, that areas A and B be distinguishable from the outside by means of different brightness, the partition 18 is advisably extended forward until the back surface of liquid crystal cell 12.

While the invention has been illustrated and described with reference to specific embodiments of a display apparatus for displaying measured values, functions, conditions and the like, it is not intended to be limited to the details shown and described, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A display apparatus for displaying signs indicative of measured values, functions, conditions and disturbances in a motor vehicle, comprising
    a housing having a relatively large, open top portion, a relatively small, closed bottom wall, and sloping lateral walls for connecting said bottom wall with said top portion, said lateral walls having a light reflecting inner surface;
    a liquid crystal display panel arranged in said top portion to display said signs;
    a partition extending between said bottom wall and said top portion to divide the interior of said housing into compartments;
    a first light source consisting of a single lamp arranged on said bottom wall in one of said compartments to radiate light of a given coloration against the inner surface of the sloping walls in said one compartment and against an area of said liquid crystal display panel;
    a second light source consisting of a single lamp arranged in another compartment to radiate light of a different coloration against the inner surface of the sloping walls in said other compartment and against another area of said liquid crystal display panel delimited by said upright partition; and said partition extending from said liquid crystal display panel to a level above said bottom wall to permit a portion of light from said first light source to radiate against the inner surface of said sloping walls in said other compartment.

2. An apparatus according to claim 1 further comprising colored scattering foil means and fluorescent plate means located behind said scattering foil means, said colored scattering foil means and fluorescent plate means being located between said liquid crystal display panel and said compartments.

3. An apparatus according to claim 2, wherein said colored scattering foil means comprises two adjoined foils and said fluorescent plate means comprises two adjoined plates for covering said areas of said liquid crystal display panel, respectively.

4. An apparatus according to claim 1 wherein said fluorescent plate means have an end surface means facing away from said colored scattering foil means and said partition projects from said facing away end surface means of said fluorescent plate means.

5. An apparatus according to claim 1 wherein said partition projects from said back surface of said liquid crystal display panel.

6. A display apparatus for displaying signs indicative of measured values, functions, conditions and disturbances in a motor vehicle, comprising a housing having a relatively large, open top portion, a relatively small, closed bottom wall, and sloping lateral walls for connecting said bottom wall with said top portion, said lateral walls having a light reflecting inner surface;

a liquid crystal display panel arranged in said top portion to display said signs;

a partition extending from said bottom wall to said top portion to divide the interior of said housing into compartments;

a first light source consisting of a single lamp arranged on said bottom wall in one of said compartments to radiate light of a given coloration against the inner surface of the sloping walls in said one compartment and against an area of said liquid crystal display panel;

a second light source consisting of a single lamp arranged in another compartment to radiate light of a different coloration against the inner surface of the sloping walls in said other compartment and against another area of said liquid crystal display panel delimited by said upright partition; and further comprising a third light source consisting of a single lamp arranged in said other compartment to illuminate said other area of said liquid crystal display panel with light of the same coloration as that of said first light source.

7. An apparatus according to claim 6 wherein said colored scattering foil means has back surface means and said partition projects from said back surface means of said scattering foil means.

* * * * *